United States Patent
Hayashi et al.

(10) Patent No.: US 7,116,868 B2
(45) Date of Patent: Oct. 3, 2006

(54) OPTICAL BRANCH DEVICE AND OPTICAL COUPLER MODULE

(75) Inventors: Nobuhiko Hayashi, Osaka (JP);
Mitsuaki Matsumoto, Hirakata (JP);
Keiichi Kuramoto, Kadoma (JP);
Hitoshi Hirano, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/220,850

(22) Filed: Sep. 8, 2005

(65) Prior Publication Data

US 2006/0067622 A1 Mar. 30, 2006

(30) Foreign Application Priority Data

Sep. 30, 2004 (JP) ............... 2004-288078

(51) Int. Cl.
*G02B 6/26* (2006.01)
*G02B 6/42* (2006.01)

(52) U.S. Cl. ...................................... 385/45

(58) Field of Classification Search ............ 385/43–46, 385/48
See application file for complete search history.

(56) References Cited

U.S. PATENT DOCUMENTS

| | | | | | |
|---|---|---|---|---|---|
| 5,058,978 | A | * | 10/1991 | Kondoh et al. | 385/43 |
| 5,091,986 | A | * | 2/1992 | Arii et al. | 385/48 |
| 5,949,931 | A | * | 9/1999 | Kitamura | 385/28 |
| 2002/0085785 | A1 * | | 7/2002 | Kishimoto et al. | 385/14 |
| 2003/0016914 | A1 * | | 1/2003 | Kim | 385/45 |

FOREIGN PATENT DOCUMENTS

JP 8-271744 A 10/1996

OTHER PUBLICATIONS

KR 2004017539A, "Three-branch optical waveguide", Feb. 27, 2004.*
"Introductory Lecture, Basis and Actual Application of Optical Waveguide Design," pp. 4-5, 14-19 and 66-71, Technical Information Institute Co., Ltd. (Japanese only).
"Introductory Lecture, Basis and Actual Application of Optical Waveguide Design," pp. 4-5, 14-19 and 66-71, Technical Information Institute Co., Ltd.

* cited by examiner

*Primary Examiner*—Michelle Connelly-Cushwa
*Assistant Examiner*—Chris Chu
(74) *Attorney, Agent, or Firm*—McDermott Will & Emery LLP

(57) ABSTRACT

An optical branch device, comprising: a branch portion having a first branch waveguide extended linearly and continuously from a waveguide in a basis portion, and second and third branch waveguides extended in the directions farther from the first branch waveguide in such a manner that the first branch waveguide is interposed between the second and third branch waveguides; a parallel portion in which the second and third branch waveguides are positioned in parallel to the first branch waveguide; and a divergent portion in which the second and third branch waveguides are extended gradually farther from the first branch waveguide; wherein the interval pitch P (μm), in the transverse direction, between the first, second and third branch waveguides in the parallel portion and the refractive index difference (Δn) between the core and the clad are set in such a manner that C satisfies a relationship of C=0.5±0.2 wherein C is calculated by substituting P and Δn for an equation of $C = \Delta n \times P^2$.

5 Claims, 15 Drawing Sheets

OPTICAL BRANCH DEVICE AND OPTICAL COUPLER MODULE

BACKGROUND OF THE INVENTION

1. Field of the Invention

The present invention relates to an optical branch device for branching signal light in optical communication or the like.

2. Description of the Related Art

In optical communication or like, an optical branch device for branching input signal light into plural components is used as the need arises.

FIG. 23 is a plan view of waveguides of a conventional 4-branched device. In this conventional 4-branched device, a basic waveguide 1 is branched into 4 waveguides 2a, 2b, 3 and 4 at a time. FIG. 24 is a graph showing dimensions of the waveguides when optical outputs of the branched waveguides are simulated about the conventional 4-branched device illustrated in FIG. 23. The transverse axis therein represents the length X in the transverse direction, and the vertical axis represents the length Z in the vertical direction.

FIG. 25 is a graph showing results of the simulation. The transverse axis therein represents the waveguide width of each of the waveguides, and the vertical axis therein represents the output ratio of the inside waveguides 2a and 2b to the outside waveguides 3 and 4 (the ratio of the inside output/the outside output). $\Delta n$'s each show the refractive index difference between the core of the waveguides and the clad thereof. As shown in FIG. 25, the ratio of the inside output/the outside output varies with a change in the waveguide width. The ratio of the inside output/the outside output varies with a change in the $\Delta n$. In optical branch devices, it is desired that optical outputs from their respective branched waveguides are equal to each other and uniform. However, as shown in FIG. 25, in conventional optical branch devices, outputs from their respective branched waveguides are largely varied in accordance with fluctuation in the waveguide width thereof or the refractive index difference ($\Delta n$) between their core and their clad. Accordingly, outputs from the respective branched optical waveguides are varied by variation in production conditions. Thus, there is a problem that devices having a uniform quality cannot be produced with a high yield.

As a conventional 4-branched device, known is a 4-branched device wherein one waveguide is first branched into three waveguides and subsequently the central waveguide is further branched into two waveguides (JP-A-8-271744 and so on). In such an optical branch device, it is preferred that one waveguide is firstly branched into three waveguides so as to make the optical intensity of the central waveguide two times larger that of the waveguides on both sides thereof, that is, so as to set the ratio between outputs therefrom to 1/2/1, and subsequently the central waveguide is branched into two waveguides so as to set the ratio between optical intensities therefrom to 1/1, whereby the finally-branched four waveguides emit optical signals at an optical output ratio of 1/1/1/1.

FIG. 26 is a plan view of the initially-branched, 3-branched portion in the 4-branched device. Three branched optical paths 2, 3 and 4 are branched in the form of straight lines from a basic waveguide 1. About this 3-branched waveguide, it is known that when the branch angles θ between the waveguide 2 and the waveguide 3 and between the waveguide 2 and the waveguide 4 are set to 1° or less, the optical intensity ratio of the branched path 3/the branched path 2/the branched path 4 becomes a ratio of 1/2/1 (Correspondence course lecture text "Introductory Lecture, Basis and Actual Application of Optical Waveguide Design", published by Technical Information Institute Co., Ltd., Second Section, pp. 4–5).

Accordingly, in a 3-branched waveguide as illustrated in FIG. 26, the branch angles θ therein are set into 1° or less and then the central branched waveguide is further branched into two, whereby a 4-branched device wherein outputs from the respective branched waveguides are equal to each other can be yielded. FIG. 27 is a plan view of such a 4-branched waveguide device. In the 4-branched waveguide device illustrated in FIG. 27, the branch angles θ are set to 1°, and further the interval between any adjacent two out of the 4 branched paths is set to 250 μm in order to connect the paths to an optical fiber array. Optical fiber arrays are widely used in the field of optical communication, and are devices wherein optical fibers are arranged at a pitch of 250 μm. For this reason, the length of the branched paths becomes 21.5 mm. Thus, a very long 4-branched waveguide device is unfavorably formed. If the length of waveguides becomes long in this manner, a large insertion loss (–10 log (the ratio of the output/the input) (unit: dB)) is unfavorably generated.

SUMMARY OF THE INVENTION

An object of the present invention is to provide an optical branch device capable of making optical outputs from its branched paths uniform even if the waveguide length of the device is short; and an optical coupler module using this optical branch device.

The present invention is an optical branch device comprising: a waveguide in a basic portion; a branch portion having a first branch waveguide extended linearly and continuously from the waveguide in the basis portion, and second and third branch waveguides which are branched from the basic waveguide in such a manner that the first branch waveguide is interposed therebetween and which are each extended in the directions farther from the first branch waveguide; a parallel portion composed of the first, second and third branch waveguides extended continuously from the branch portion, in which the second and third branch waveguides are positioned in parallel to the first branch waveguide; and a divergent portion composed of the first, second and third branch waveguides extended continuously from the parallel portion, in which the second and third branch waveguides are extended gradually farther from the first branch waveguide.

In the present invention, the parallel portion, wherein the second and third branch waveguides are positioned in parallel to the first branch waveguide, is formed between the branch portion and the divergent portion. The formation of this parallel portion causes stabilization of the optical intensity of the central first branch waveguide and the optical intensities of the second and third branch waveguides on both sides thereof. In the present invention, preferably, the first, second and third branch waveguides are each composed of a core having a relatively high refractive index and a clad arranged around the core and having a relatively low refractive index, and the interval pitch P (μm), in the transverse direction, between the first, second and third branch waveguides in the parallel portion and the refractive index difference ($\Delta n$) between the core and the clad are set in such a manner that C satisfies a relationship of C=0.5±0.2 wherein C is calculated by substituting P and $\Delta n$ for an equation of $C = \Delta n \times P^2$. In the parallel portion, the interval pitch P (μm), in the transverse direction, between the first, second and third branch waveguides in the parallel portion and the refractive index difference (Δn) between the core and the clad are set in such a manner that C satisfies the relationship of C=0.5±0.2 wherein C is calculated by substituting P and Δn for the equation of C =Δn×P², thereby to provide more excellent stabilization of the optical intensity of the central first branch waveguide and the optical intensities of the second and third branch waveguides on both sides thereof. In other words, even if the width of the optical waveguides or the refractive index difference Δn between the core and the clad is varied, an optical branch device can be produced in the state that effect of the variation is decreased.

In the present invention, it is necessary to form the parallel portion between the branch portion and the divergent portion, and it is preferred that the length of the parallel portion is made as short as possible. Specifically, it is preferred that the length of the parallel portion is 10 μm or less. If the length of the parallel portion is large, interaction of waveguide light rays between the first, second and third branch waveguides becomes too large so that the optical intensity ratio of the second branch waveguide/the first branch waveguide/the third branch waveguide may be off from an ideal intensity ratio of 1/2/1.

In the present invention, it is preferred that the second and third branch waveguides in the branch portion are extended in the form of straight lines. That is, it is preferred that the first, second and third branch waveguides in the branch portion are each branched to be linearly extended. In other words, it is preferred that a branch waveguide branched into in the form of three straight lines is formed, as illustrated in FIG. 26. In addition, the branch angles θ are preferably 1° or less. The formation of the branch waveguides in this way makes it possible to set the optical intensity ratio between the respective waveguides to 1/2/1.

In the present invention, the basic waveguide is branched to the three waveguides through the above-mentioned branch portion and subsequently the parallel portion is formed. Furthermore, the divergent portion is formed. It is preferred that in the divergent portion, the second and third branch waveguides are branched more abruptly farther from the first branch waveguide in the branch portion. For example, it is preferred that the second and third branch waveguides are away in the form of arcs from the first branch waveguide. When the second and third branch waveguides are formed in such an arc form in the divergent portion, the length of the optical branch device can be made small.

In the present invention, the first branch waveguide may be further branched into two branch waveguides, thereby producing a 4-branched device, wherein four waveguides are branched from the basic waveguide. As described above, according to the present invention, the optical intensity ratio of the second branch waveguide/the first branch waveguide/the third branch waveguide can be set to an ideal ratio of 1/2/1. When the first branch waveguide is further branched into two branch waveguides, the optical intensity ratio between the four branch waveguides can be set to a ratio of 1/1/1/1. The two branch waveguides from which the first branch waveguide is branched are preferably formed to give an optical intensity ratio of 1/1. Accordingly, it is preferred that the two branch waveguides are formed to have a left-right symmetric shape.

The optical coupler module of the present invention comprises the above-mentioned optical branch device of the present invention and an optical fiber connected to an end of each of the waveguides in the optical branch device.

In the optical coupler module of the invention, the optical branch device of the invention is used; therefore, the optical intensity of each of the branch waveguides is stable and effect of variation in production conditions or the like can be reduced. Furthermore, the optical coupler module of the present invention using the optical branch device of the invention can be made small-sized since the waveguide of this optical branch device can be made short.

In the present invention, the waveguides are each composed of a core having a relatively high refractive index and a clad arranged around the core and having a relatively low refractive index. The materials which constitute the core and the clad are not particularly limited, and may be any material that can constitute a core of an optical waveguide and any material that can constitute a clad of the optical waveguide, respectively. In the invention, it is particularly preferred that the core and the clad are each made of a resin-based material.

It is preferred to use, as the resin-based material, an organic and inorganic composite. The use of the organic and inorganic composite makes it possible to give an optical waveguide excellent in light-propagating property, heat resistance, chemical agent resistance, mechanical strength, and others.

The organic and inorganic composite can be produced from, for example, an organic polymer and a metal alkoxide. The organic and inorganic composite may be produced from at least one metal alkoxide. In this case, it is preferred that the organic and inorganic composite is produced from at least two metal alkoxides.

When the combination of an organic polymer and a metal alkoxide or the combination of at least two metal alkoxides is appropriately adjusted, the refractive index of a finally formed organic and inorganic composite can be adjusted.

The metal alkoxide used may be a metal alkoxide having a polymerizable group that can be polymerized by light (ultraviolet rays) or heat. In this case, it is preferred to combine the metal alkoxide, which has a polymerizable group that can be polymerized by light (ultraviolet rays) or heat, with a metal alkoxide which does not have this polymerizable group. Examples of the polymerizable group include methacryloxy, acryloxy, vinyl, and styryl groups. In the case that a clad layer and a core layer which can be cured by irradiation with ultraviolet rays are produced from an organic and inorganic composite containing a metal alkoxide, it is preferred that the composite contains, as the metal alkoxide, a metal alkoxide having a polymerizable group which can be polymerized by light (ultraviolet rays).

In the case of using the metal alkoxide having a polymerizable group, it is preferred that the polymerizable group of the metal alkoxide is polymerized by light or heat.

Examples of the metal alkoxide include alkoxides of Si, Ti, Zr, Al, Sn, Zn, Nb and other metals. It is particularly preferred to use an alkoxide of Si, Ti, Zr or Nb. It is therefore preferred to use an alkoxysilane, titanium alkoxide, zirconium alkoxide, or niobium alkoxide. It is particularly preferred to use an alkoxysilane.

Examples of the alkoxysilane include tetraethoxysilane, tetramethoxysilane, tetra-n-propoxysilane, tetraisopropoxysilane, ttra-n-butoxysilane, tetraisobutoxysilane, phenyltriethoxysilane (PhTES), phenyltrimethoxysilane (PhTMS), diphenyldimethoxysilane, and diphenyldiethoxysilane.

Examples of the alkoxysilane having the above-mentioned polymerizable group include 3-methacryloxypropyltriethoxysilane (MPTES), 3-methacryloxypropyltrmethoxysilane (MPTMS), 3-methacryloxypropylmethyldimethoxysilane, 3-acryloxypropyltrimethoxysilane, p-styryltriethoxysilane, p-styryltrimethoxysilane, vinyltrimethoxysilane, and vinyltriethoxysilane.

Examples of the titanium alkoxide include titanium isopropoxide, and titanium butoxide. Examples of the zirconium alkoxide include zirconium isopropoxide and zirconium butoxide.

An example of the niobium alkoxide is pentaethoxyniobium.

As the metal alkoxide, any one of the above-mentioned metal alkoxides may be used, and in general the following may be used: a metal alkoxide represented by the formula $M(OR)_n$, $R'M(OR)_{n-1}$ or $R'_2M(OR)_{n-2}$ wherein M represents a metal, n is 2, 3, 4 or 5, and R and R' each represent an organic group. Examples of the organic group include alkyl groups, aryl groups, and organic groups having any one of the above-mentioned polymerizable groups. M may be Si, Ti, Zr, Al, Sn, Zn, Nb or the like, as described above. The alkyl groups are preferably alkyl groups having 1 to 5 carbon atoms.

In the case of producing the organic and inorganic composite from an organic polymer and a metal alkoxide, the organic polymer may be any organic polymer which can be combined with a metal alkoxide to yield an organic and inorganic composite. Examples of the organic polymer include a polymer having a carbonyl group, and a polymer having a benzene ring, and a polymer having a naphthalene ring.

Specific examples of the organic polymer include polyvinylpyrrolidone, polycarbonate, polymethyl methacrylate, polyamide, polyimide, polystyrene, polyethylene, polypropylene, epoxy resin, phenol resin, acrylic resin, urea resin, and melamine resin. In order to produce an organic and inorganic composite excellent in optical transparency, it is preferred to use -polyvinyl pyrrolidone, polycarbonate, polymethyl methacrylate, polystyrene, epoxy resin or a mixture thereof.

In the case of curing the organic and inorganic composite by irradiation with light (ultraviolet rays), it is preferred to incorporate a photopolymerization initiator into the organic and inorganic composite. The incorporation of the photopolymerization initiator makes it possible to cure the organic and inorganic composite at only a slight radiation amount of light (ultraviolet rays).

Specific examples of the photopolymerization initiator include benzylketal, a-hydroxyacetophenone, a-aminoacetophenone, acylphosphine oxide, 1-hydroxy-cyclohexyl-phenyl-ketone, 2-benzyl-2-dimethylamino-1-(4-morpholinophenyl)-butanone-1, trichloromethyltriazine, diphenyliodonium salts, triphenylsulfonium salts, and imide sulfonate.

As the resin-based material, a UV curable resin may be used. Examples of the UV curable resin include epoxy UV curable resin made mainly of an epoxy resin, acrylic UV curable resin, epoxy acrylate UV curable resin, polyurethane UV curable resin, and urethane acrylate UV resin.

According to the present invention, it is possible to produce an optical branch device capable of making optical outputs from its respective branched waveguides uniform even if the waveguide length of the device is short.

The optical branch device of the present invention is less affected by variation in production conditions or the like. Accordingly, optical branch devices having a uniform quality can be produced with a high productivity.

DESCRIPTION OF THE PREFERRED EMBODIMENTS

The present invention will be described by way of examples thereof hereinafter. However, the invention is not limited to the following examples, and can be carried out with any appropriate modification as long as the subject matter of the invention is not changed.

Figure 1:
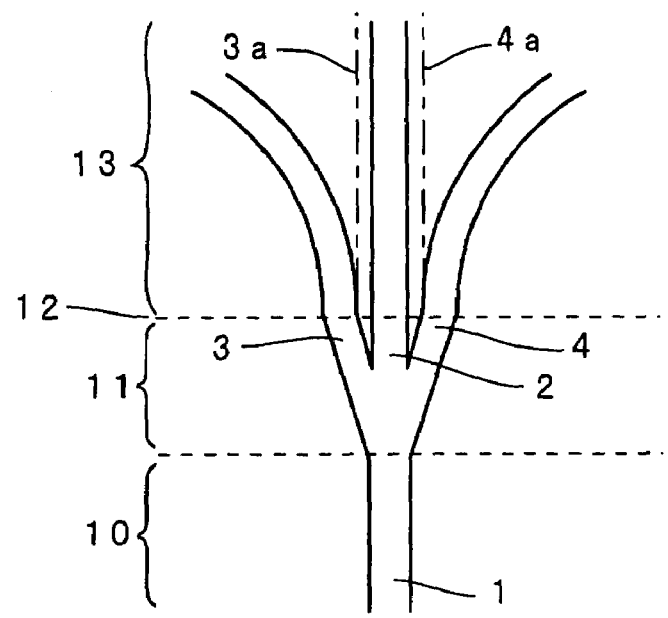
FIG. 1 is a plan view illustrating a waveguide of an optical branch device of an example according to the present invention.

FIG. 1 is a plan view illustrating a waveguide of an optical branch device of an example according to the present invention. The waveguide of the optical branch device of the present example is composed of a basic portion 10, a branch portion 11, a parallel portion 12, and a divergent portion 13. In the branch portion 11, three branch waveguides, that is, a first branch waveguide 2, a second branch waveguide 3 and a third branch waveguide 4 are branched from a waveguide 1 in the basic portion 10. The first branch waveguide 2 is linearly extended continuously from the waveguide 1. The second branch waveguide 3 and the third branch waveguide 4 are formed in such a manner that the first branch waveguide 2 is interposed therebetween, and are each formed so as to be linearly extended in the directions farther from the first branch waveguide 2.

The parallel portion 12 is positioned continuously from the branch portion 11. The parallel portion 12 has a very small length, and is formed as a boundary area between the divergent portion 13 and the branch portion 11. The divergent portion 13 is composed of the first branch waveguide 2 which is linearly and continuously extended, and the second and third branch waveguides 3 and 4 which are extended, in the form of arcs, gradually farther from the first branch waveguide 2. The second and third branch waveguides 3 and 4, which are formed in the form of the arcs, each have a curvature radius R that is not particularly limited. The curvature radius R is preferably from about 40000 μm to 60000 μm.

As described above, in the present example, the parallel portion 12 is formed so as to be very short. In this parallel portion 12, the second and third branch waveguides 3 and 4 are formed to be parallel to the first branch waveguide 2. Accordingly, tangent lines 3a and 4a of the second and third branch waveguides 3 and 4, which are formed in the form of the arcs, in the parallel portion 12 are parallel to the first branch waveguide 2.

Figure 2:
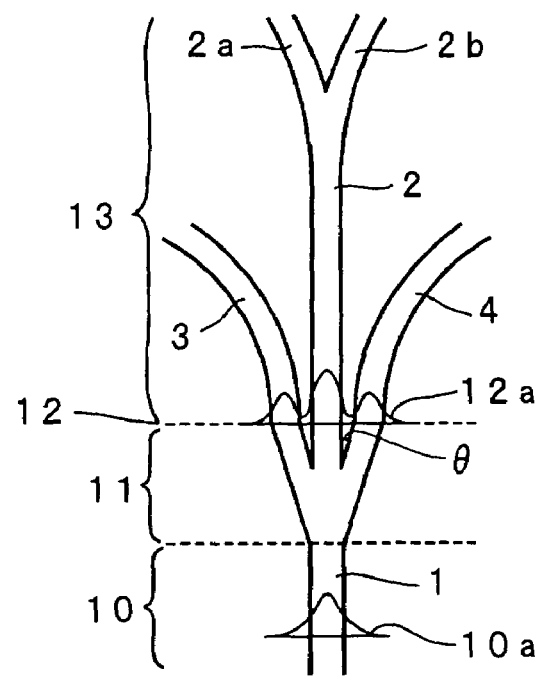
FIG. 2 is a plan view illustrating a waveguide of an optical branch device of another example according to the present invention.

FIG. 2 is a plan view illustrating a waveguide of an optical branch device of another example according to the present invention. In the present example, a first branch waveguide 2 is branched into two branch waveguides 2a and 2b in a divergent portion 13. Finally, therefore, four waveguides 3, 2a, 2b and 4 are branched from a waveguide 1 in a basic portion 10.

In the example illustrated in FIG. 2, branch angles θ between the first branch waveguide 2 and the second branch waveguide 3 and between the first branch waveguide 2 and the third branch waveguide 4 in a branch portion 11 are each 0.3°.

A line 10a represents the optical intensity distribution in the waveguide 1 in the basic portion 10. A line 12a represents the optical intensity distribution in the waveguides 2, 3 and 4 in a parallel portion 12. As is represented by the optical intensity distribution line 12a, in the parallel portion 12, the optical intensity distribution ratio between the waveguides 3, 2 and 4 is a ratio of 1/2/1. Since the waveguide 2 is finally branched, at its front end thereof, into the two waveguides 2a and 2b, the optical intensity distribution ratio between the waveguides 3, 2a, 2b and 4 is a ratio of 1/1/1/1.

Figure 3:
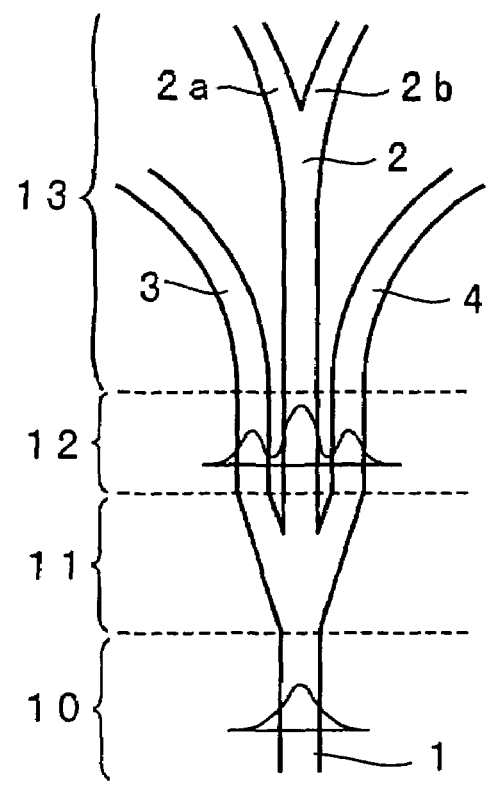
FIG. 3 is a plan view illustrating a waveguide of an optical branch device of still another example according to the present invention.

FIG. 3 is a plan view illustrating a waveguide of an optical branch device of still another example according to the present invention. In the present example, its parallel portion 12 is longer than in the example illustrated in FIG. 2. The length of the parallel portion 12 is preferably as small as possible, and is preferably, for example, 10 μm or less.

Light rays overlap between waveguides in the parallel portion 12, so that the waveguide light rays fall in a state that they interact with each other. By the realization of this state, the optical intensity distribution therein becomes equal to a distribution based on a zero-order mode of a seven-layer slab waveguide as illustrated in FIG. 1.6(a) in Correspondence course lecture text "Introductory Lecture, Basis and Actual Application of Optical Waveguide Design", published by Technical Information Institute Co., Ltd., Second Section, pp. 4–5, that is, an optical intensity distribution ratio of 1/2/1.

However, if such a parallel portion becomes long, the parallel portion acts as a directional coupler so that energies of light rays are given and taken between the waveguides, thereby generating a phenomenon that the intensities of the light rays act periodically on each other to become intense or faint. Accordingly, if the parallel portion becomes long, the optical output ratio is periodically shifted from 1/2/1. For this reason, in the invention, the presence of the parallel portion is essential but the length thereof is preferably as small as possible.

Figure 4:
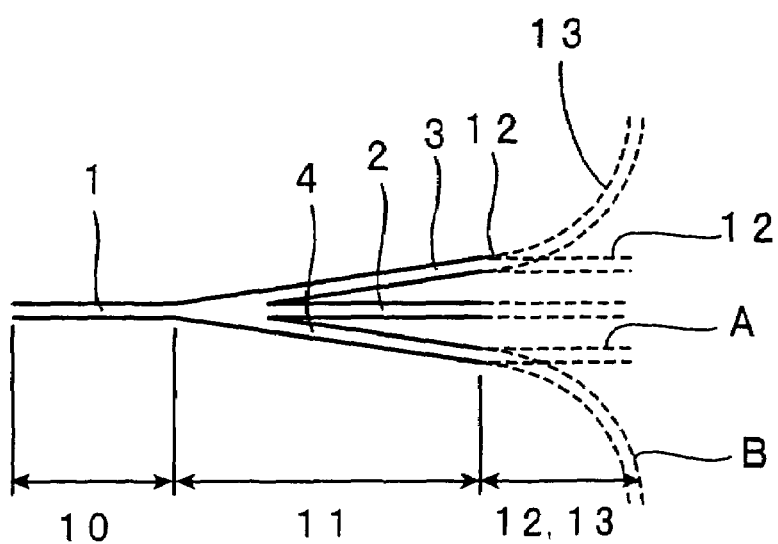
FIG. 4 is a plan view illustrating the dimensional shape of simulated waveguides.

FIG. 4 is a plan view for illustrating the dimensional shape of waveguides used to simulate the stability of the optical intensity in the case of making the parallel portion 12 short and in the case of making the portion 12 long. In the example shown in FIG. 4, the length of a basic portion 10 and that of a branch portion 11 are set to 1000 μm and 2000 μm, respectively. In the case represented by dot lines A, the parallel portion 12 of three waveguides 2, 3 and 4 is made long. The length thereof is set to 1000 μm. In the parallel portion 12, the interval pitch between the respective waveguides is set to 10 μm. In the case represented by dot lines B, a divergent portion 13 is formed so that the parallel portion 12 is restricted into a boundary area between the branch portion 11 and the divergent portion 13. In the case of the dot lines B, the length of the divergent portion 13 is set to 1000 μm.

In the state that the width of each of the waveguides is set to 7 μm and the refractive index difference $\Delta n$ between the core and the clad which constitute each of the waveguides is set to 0.005, simulations are made. The simulations are made on the basis of a beam propagating method (BPM) described in Correspondence course lecture text "Introductory Lecture, Basis and Actual Application of Optical Waveguide Design", published by Technical Information Institute Co., Ltd., Second Section, pp. 25–32.

Figure 5:
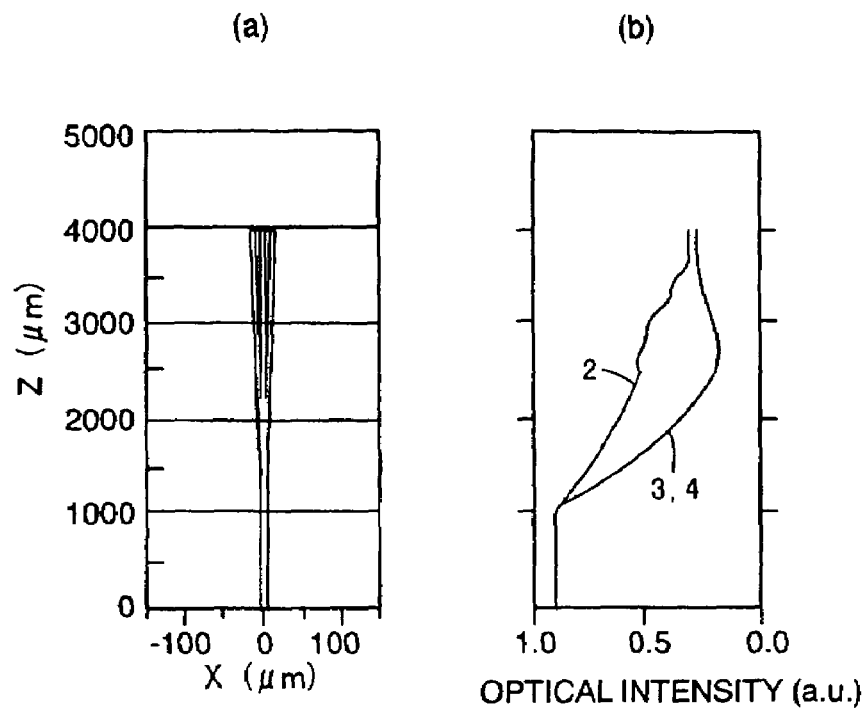
FIGS. 5(a) and 5(b) are each a graph showing simulation results of a waveguide pattern represented by dot lines A in FIG. 4.

FIGS. 5(*a*) and 5(*b*) show simulation results in the case of the dot lines A, wherein the length of the parallel portion 12 is set to 1000 µm. FIG. 5(*a*) shows the dimensional shape of the waveguides. The transverse axis therein represents the length X in the transverse direction and the vertical axis therein represents the length Z in the vertical direction (the direction in which the waveguides are extended).

FIG. 5(*b*) show the optical intensity [unit: a unit which is freely selected] in the central first waveguide 2 and that in the second and third waveguides 3 and 4 on both sides thereof.

Figure 6:
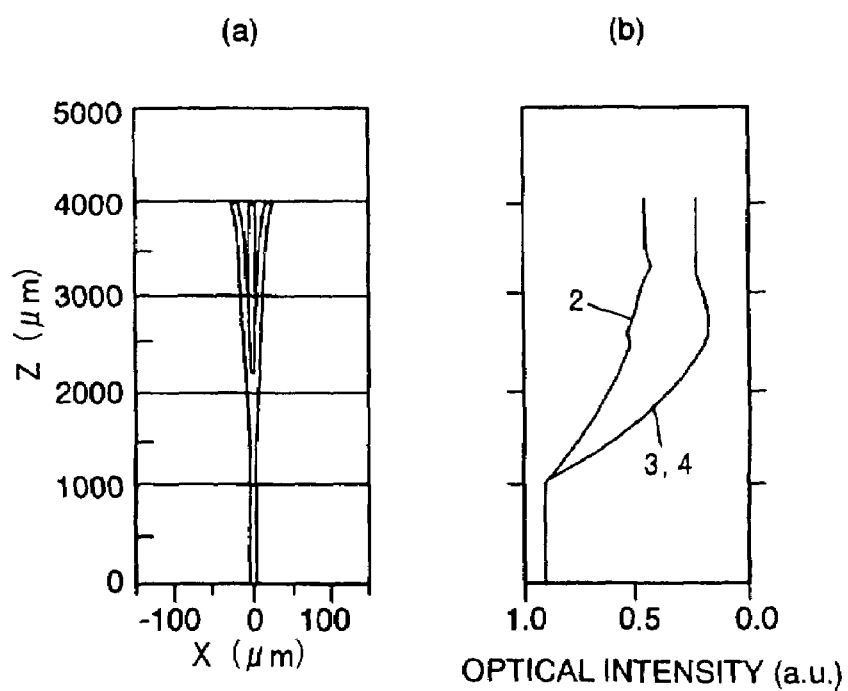
FIGS. 6(a) and 6(b) are each a graph showing simulation results of a waveguide pattern represented by dot lines B in FIG. 4.

FIGS. 6(*a*) and 6(*b*) show simulation results in the case of the dot lines B, wherein the divergent portion 13 is formed. FIG. 6(*a*) shows the dimensional shape of the waveguides. FIG. 6(*b*) show the optical intensity [unit: a unit which is freely selected] in the central first waveguide 2 and that in the second and third waveguides 3 and 4 on both sides thereof.

It is clear from comparison of FIGS. 5 and 6 with each other that when the parallel portion 12 is made long, the optical intensities in the central waveguide and in the two adjacent waveguides are unstable as shown in FIG. 5. On the other hand, it is understood that when the parallel portion 12 is formed to be limited into the boundary area between the branch portion 11 and the divergent portion 13, the optical intensities in the central waveguide 2 and in the two adjacent waveguides 3 and 4 are stable as illustrated in FIG. 6.

As is clear form the above-mentioned results, it is preferred in the present invention that the length of the parallel portion is made as small as possible.

In the present invention, it is indispensable that the interval pitch P (µm), in the transverse direction, between the branch waveguides in the parallel portion and the refractive index difference (Δn) between their core and clad are set in such a manner that C satisfies a relationship of C=0.5±0.2 wherein C is calculated by substituting P and Δn for an equation of C=Δn×p². This will be described in detail hereinafter.

Figure 7:
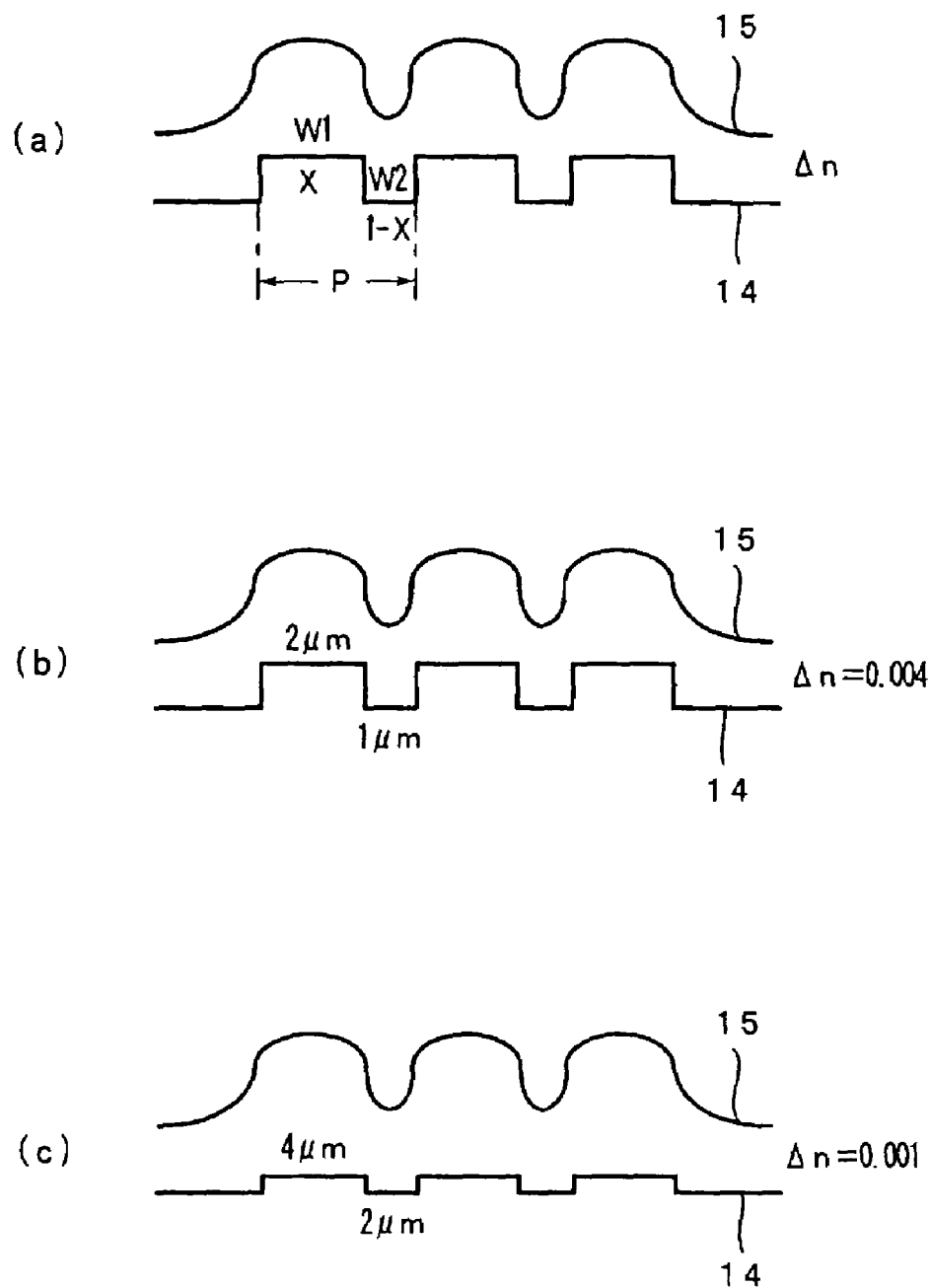
FIGS. 7(a)–7(c) are each a view showing a relationship between the interval pitch P in the transverse direction between waveguides, the refractive index difference Δn between their core and clad, and optical distribution profiles thereof.

As is described in Correspondence course lecture text "Introductory Lecture, Basis and Actual Application of Optical Waveguide Design", published by Technical Information Institute Co., Ltd., Second Section, pp. 14–19, in a waveguide, a phenomenon that the layout of the waveguide is extended r times in the x direction (in the transverse direction) is equivalent to a phenomenon that the refractive index difference Δn between the core and clad is multiplied by 1/r². With reference to FIG. 7(*a*), this matter will be descried in detail hereinafter.

FIG. 7(*a*) illustrates the refractive index 14 of three waveguides, and the optical distribution 15 in each of the waveguides. As illustrated in FIG. 7(*a*), the width of the waveguides is W1 (µm) and the interval between the waveguides is W2 (µm). When the pitch of the waveguide intervals is represented by P (µm), the ratio of W1 to P is represented by X and the ratio of W2 to P is represented by 1−X. Δn is a value of (the refractive index of the core—that of the clad).

As described above, a matter that the layout of the waveguide is extended r times in the transverse direction is equivalent to a matter that the refractive index difference Δn is multiplied by 1/r²; therefore, the value C represented by the following equation becomes constant and not variable:

$$C=\Delta n \times P^2$$

In waveguides illustrated in FIG. 7(*b*), the width of waveguides is 2 µm, the interval between the waveguides is 1 µm, and the refractive index Δn between their core and clad is 0.004. On the other hand, in FIG. 7(*c*), the layout of the waveguides illustrated in FIG. 7(*b*) is extended two times in the transverse direction and the refractive index difference Δn is multiplied by ¼. Accordingly, the value C calculated from the above-mentioned equation about the waveguides illustrated in FIG. 7(*b*) is equal to the value C about the waveguides illustrated in FIG. 7(*c*). Accordingly, the optical distribution 15 of the optical waveguide illustrated in FIG. 7(*b*) and the optical distribution 15 of the optical waveguide illustrated in FIG. 7(*c*) are equal to each other, and are equivalent with each other.

Next, about waveguide patterns wherein the width W1 of waveguides was set to 7 µm, the interval W2 between the waveguides was set to 3 µm, and Δn was changed in the range of 0.003 to 0.008 so as to change the value C, the optical intensity distribution thereof was calculated by simulation. The calculated results are shown in FIG. 8.

Figure 8:
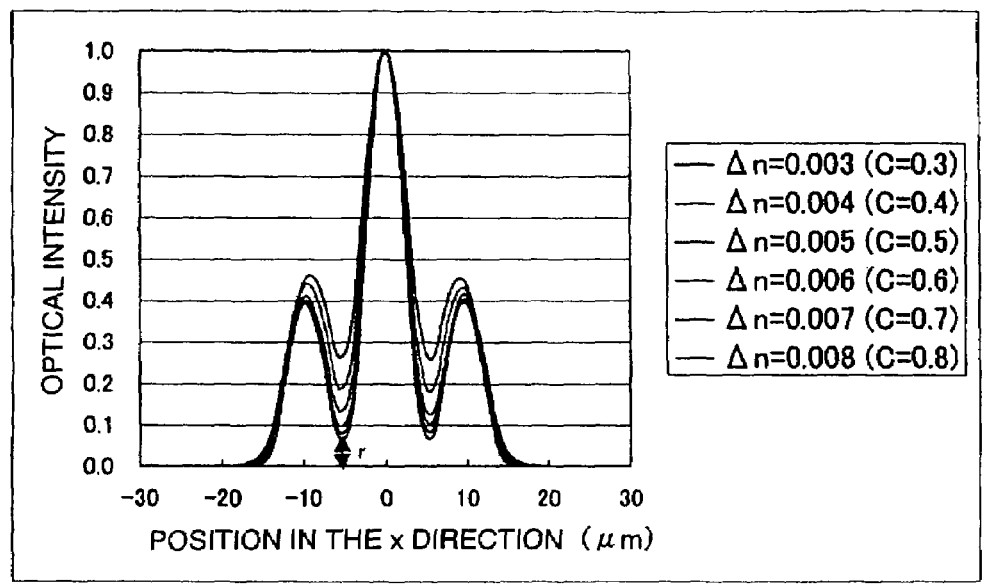
FIG. 8 is a graph showing an optical intensity distribution when the refractive index difference Δn is changed so as to change the C obtained from a given equation.

As shown in FIG. 8, in each of the waveguide patterns, three optical intensity peaks are obtained, and these peaks correspond to the three waveguides. Portions wherein the optical intensity is small between the central peak and the peaks on both sides thereof correspond to gap portions between the waveguides. It appears that the overlap of light rays between the waveguides is generated in these portions. The matter that the optical intensity r in the overlap portions becomes small means that the overlap of light rays between the waveguides becomes small.

Among profiles of the optical intensity in FIG. 8, profiles wherein the value C is smaller are arranged at higher positions. As the value C becomes larger, profiles are positioned at lower positions. As is clear from FIG. 8, the value r becomes smaller so that the overlap of light rays becomes smaller as the value C becomes larger.

Next, about waveguide patterns wherein the width W1 of waveguides was set to 7 µm, the refractive index difference Δn was set to a constant value of 0.005 and the interval x between the waveguides was changed, the optical intensity thereof was calculated by simulation in the same way as described above. The results are shown in FIG. 9.

Figure 9:
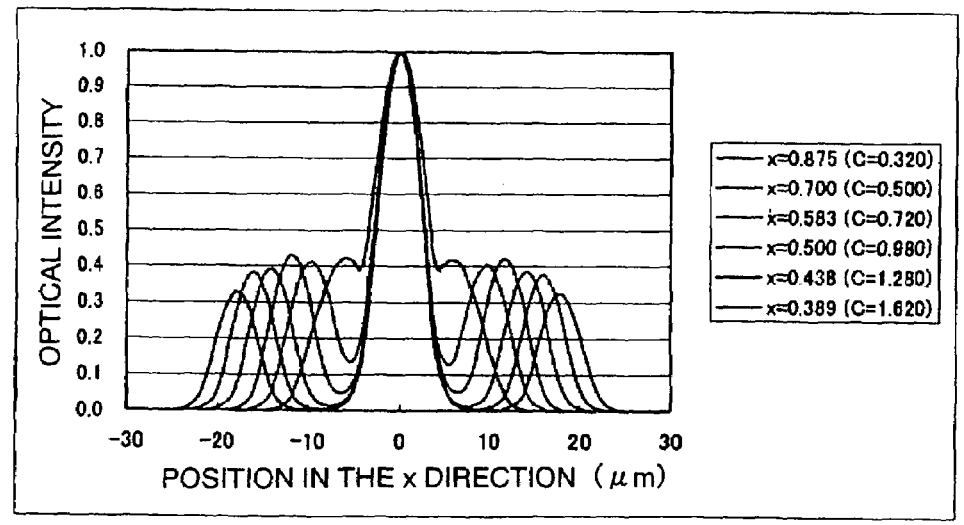
FIG. 9 is a graph showing an optical intensity distribution when the gap between the waveguides is changed so as to change the C.

As is shown in FIG. 9, in the case of changing the interval between the waveguides to change the value C, in the same manner the optical intensity r in the overlap portions becomes smaller so that the overlap of light rays between the waveguides becomes smaller as the value C becomes larger.

Figure 10:
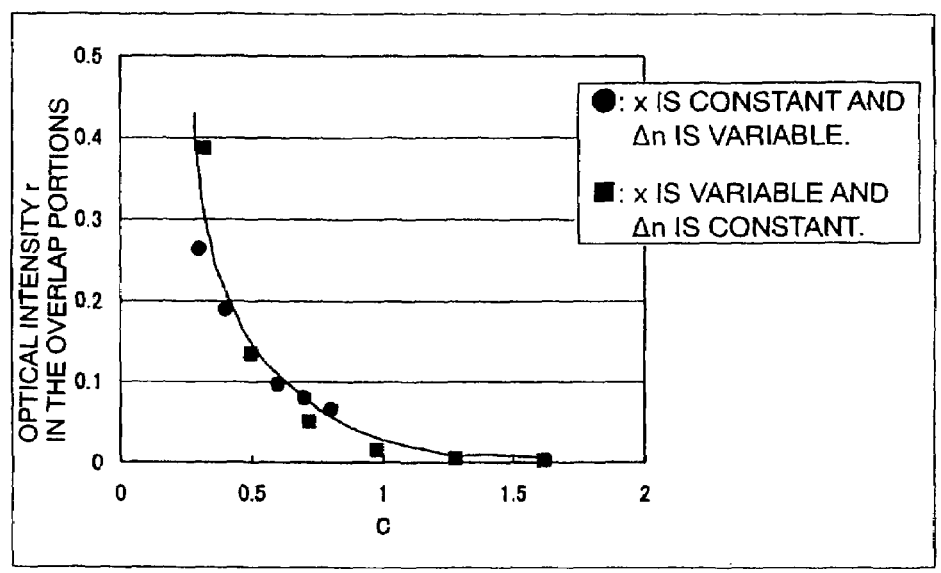
FIG. 10 is a graph showing a relationship between the C and the optical intensity r of an overlap portion illustrated in FIGS. 8 and 9.

FIG. 10 is a graph showing a relationship between the optical intensity r in the overlap portions and the value C shown in FIGS. 8 and 9. As is clear from FIG. 10, the optical intensity r in the overlap portions tends to become smaller as the value C becomes larger. It is therefore understood that the degree of the overlap of light rays between the waveguides is represented by the value C.

Next, about the optical branch waveguide profile represented by the dot lines B in FIG. 4, a relationship between the optical output ratio of the inside waveguide to the two outside waveguides (the ratio of the inside output to the outside output) and the value C was obtained by simulation. The branch angles θ were each set to 0.3°, and the curvature radius R of the waveguides on both sides of the divergent portion 13 was set to 45 mm.

Figure 11:
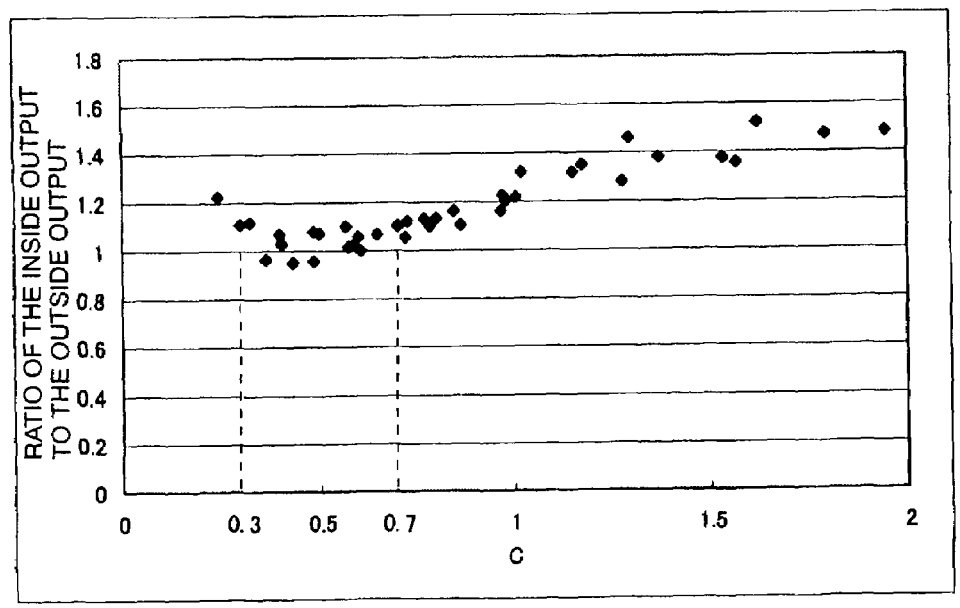
FIG. 11 is a graph showing a relationship between the C and the ratio of the inside output of the optical intensity/the outside output thereof in waveguides.

FIG. 11 shows a graph showing the results. As shown in FIG. 11, in the range where the value C is from 0.3 to 0.7, that is, from 0.5±0.2, the ratio of the inside output to the outside output is about 1. It is therefore understood that when the refractive index difference Δn and the interval pitch P in the transverse direction between the waveguides are set in such a manner that the value C falls into the range of 0.5±0.2, the ratio of the inside output to the outside output can be set to about 1 so that stable optical intensity can be obtained.

Furthermore, it is understood from FIG. 10 that the range where the value C is from 0.3 to 0.7 corresponds to the range where the optical intensity r in the overlap portions is from 0.08 to 0.25 and further the optical intensity r in the overlap portions is preferably from 0.08 to 0.25.

Figure 12:
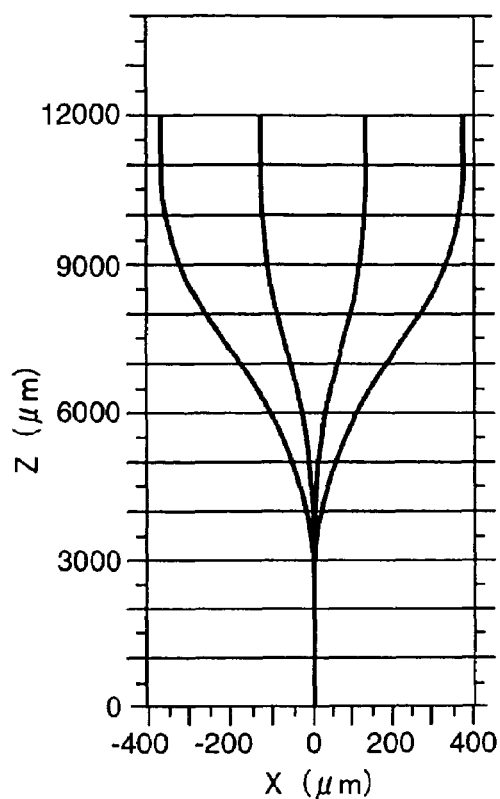
FIG. 12 is a graph showing a waveguide profile used for simulation of a further example according to the present invention.
Figure 13:
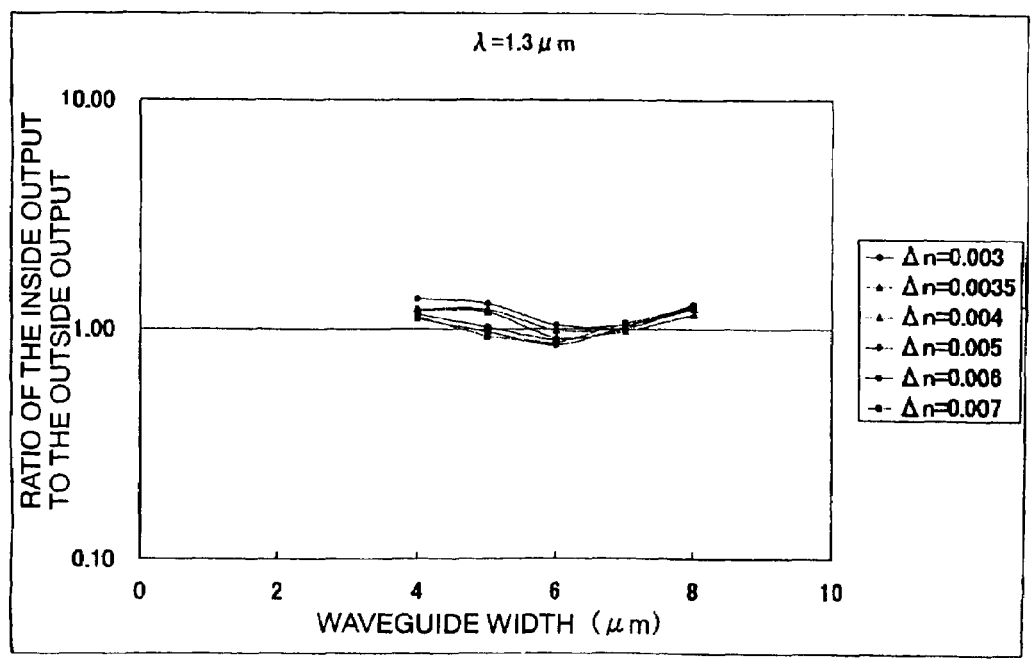
FIG. 13 is a graph showing a relationship between the waveguide width, the refractive index difference Δn, and the ratio of the inside output of the optical intensity/the outside output thereof in the example shown in FIG. 12.

FIG. 12 is a graph showing a waveguide profile when the waveguide width and the refractive index difference Δn were changed to make a simulation. The ratio of the inside output to the outside output obtained when the waveguide width and the refractive index difference Δn were changed is shown in FIG. 13. In FIG. 13, the interval pitches P in the transverse direction between the waveguides are each 10 μm, and thus the value C is plotted in the range of 0.3 to 0.7.

As is evident from FIG. 13, when the value C is adjusted into the range of 0.5±0.2 in accordance with the present invention, the ratio of the inside output to the outside output about the optical intensity in the waveguides can be set to about 1 even if the waveguide width and the refractive index difference Δn are changed. Consequently, stable optical output can be obtained.

Figure 14:
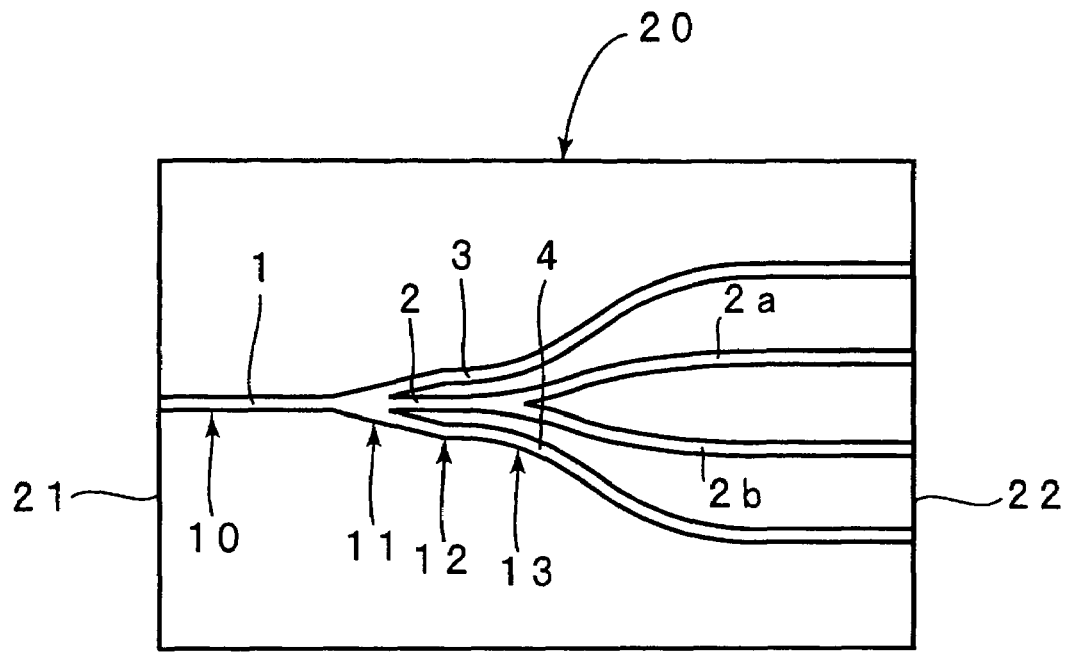
FIG. 14 is a plan view illustrating an optical branch device of a still further example according to the present invention.

FIG. 14 is a plan view illustrating an optical branch device 20 according to a still further example of the present invention. A waveguide 1 in a basic portion 10 is branched into first, second and third branch waveguides 2, 3 and 4 in a branch portion 11. After the branching, a parallel portion 12 is formed wherein the respective waveguides are parallel to each other, and then a divergent portion 13 is formed wherein the waveguides 3 and 4 on both sides are extended in the directions farther from the central waveguide 2. In the divergent portion 13, the central waveguide 2 is further branched into two waveguides 2a and 2b. As a result, four branch waveguides are present.

Figure 15:
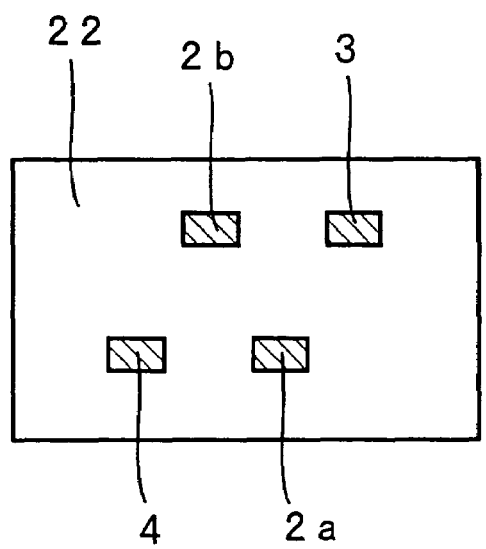
FIG. 15 is a side view illustrating an output side end face of the optical branch device illustrated in FIG. 14.

FIG. 15 is a side view illustrating an output side end face 22 of the optical branch device 20. As illustrated in FIG. 15, the waveguides 4 and 2a are arranged at lower positions, and the waveguides 2b and 3 are arranged at higher positions.

Figure 16:
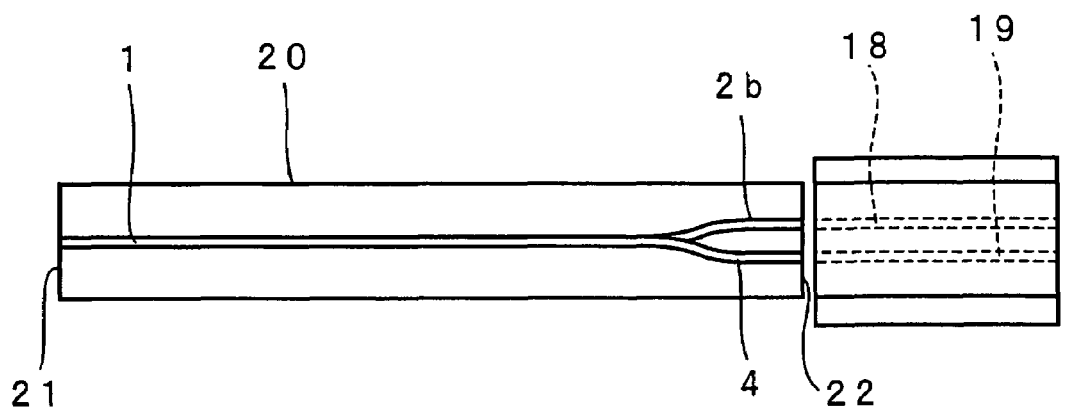
FIG. 16 is a front view illustrating a state that the optical branch device illustrated in FIG. 14 is connected to optical fibers.
Figure 17:
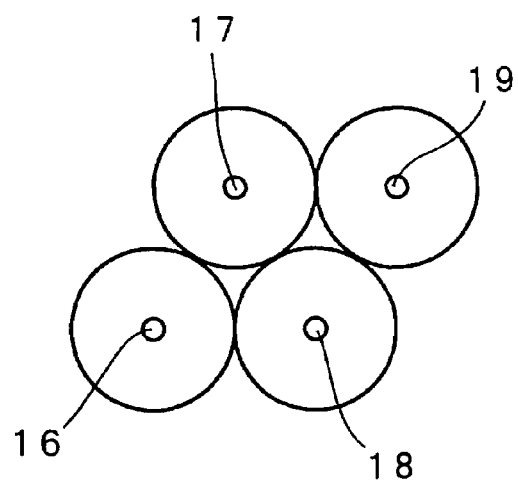
FIG. 17 is a side view illustrating a state that the optical fiber in FIG. 16 is arranged.
Figure 23:
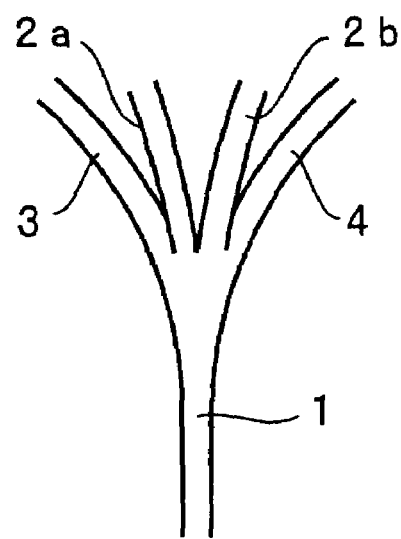
FIG. 23 is a plan view illustrating a waveguide in a conventional optical branch device.
Figure 24:
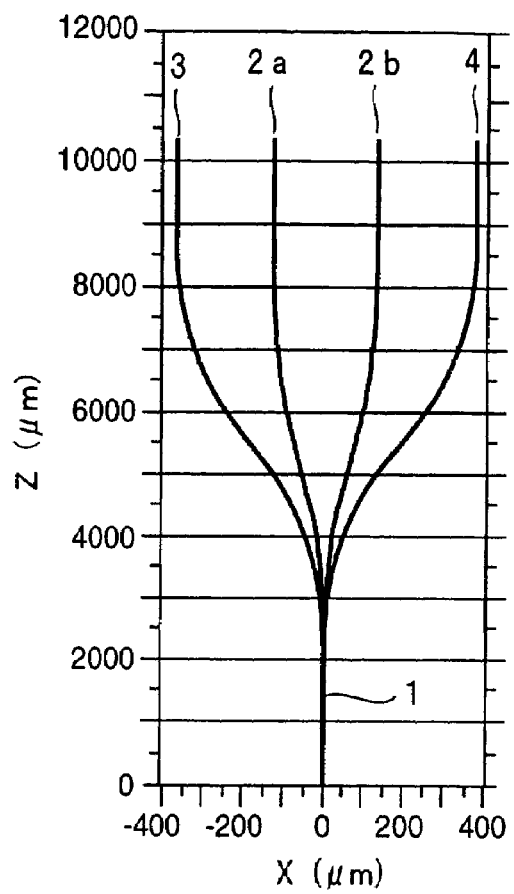
FIG. 24 is a graph showing an optical waveguide pattern for simulation of the conventional optical branch device.
Figure 25:
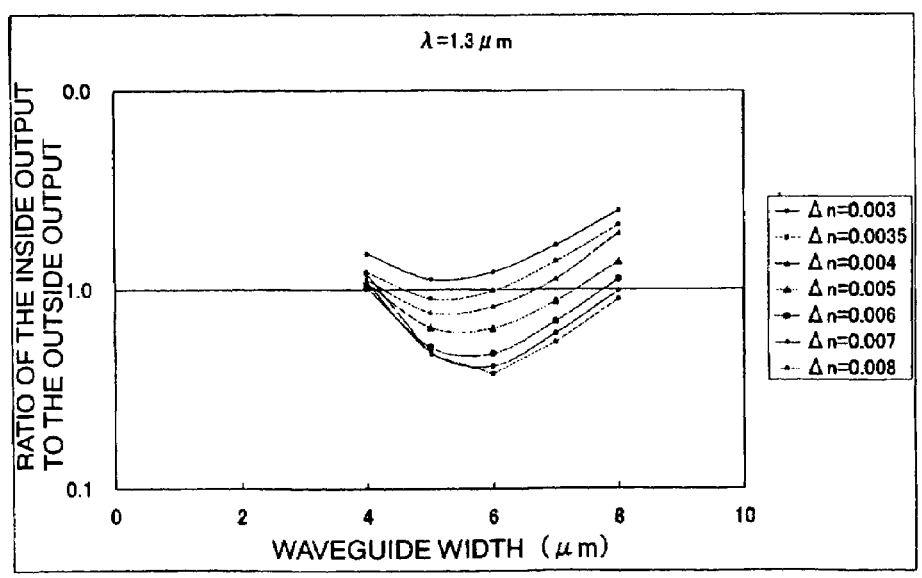
FIG. 25 is a graph showing a relationship between the waveguide width of the conventional optical branch device, the refractive index difference $\Delta n$ thereof, and the ratio of the inside output/the outside output thereof.
Figure 26:
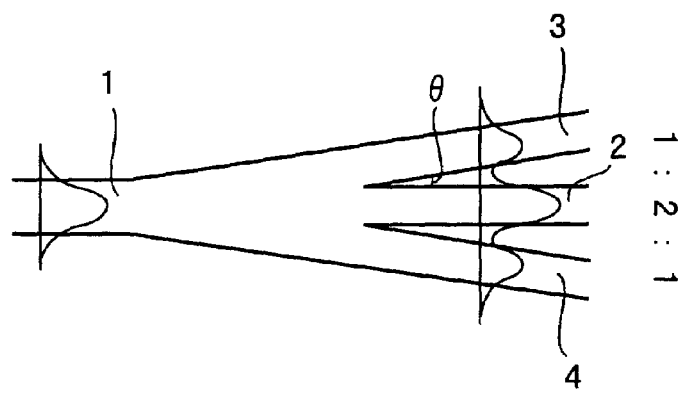
FIG. 26 is a plan view illustrating a branch portion in a conventional optical branch device.
Figure 27:
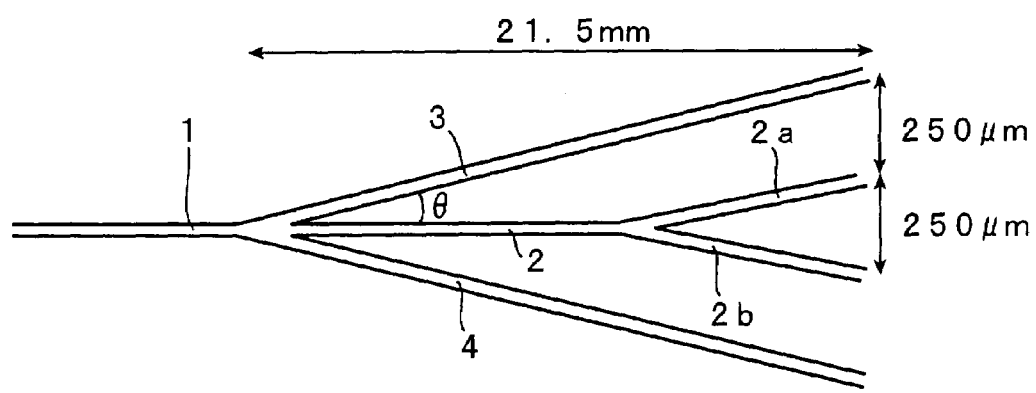
FIG. 27 is a plan view illustrating a waveguide in the conventional optical branch device.

FIG. 16 is a front view illustrating a state that optical fibers are connected to the output side end face 22 of the optical branch device 20 illustrated in FIG. 14. As illustrated in FIG. 17, as the optical fibers, four optical fibers 16 to 19 are arranged correspondingly to positions of the waveguides 2a, 2b, 3 and 4, respectively, in the output side end face 22 of the optical branch device 20. The respective waveguides are jointed to the optical fibers by pushing the waveguides against the fibers. In this way, an optical signal inputted from an input side end face 21 of the optical branch device 20 is inputted into the waveguide 1, and then this signal is branched into the four branch waveguides. Thereafter, the optical signals can be transmitted from the output side end face 22 to the four optical fibers 16 to 19. When the waveguide-branched structure of the invention illustrated in FIG. 2 or 3 is used, an optical branch device giving a stable ratio of the inside output to the outside output can be obtained. However, there is caused a problem that the waveguide length thereof becomes about 20% larger in this case than in the case of using a conventional waveguide-branched structure as shown in FIG. 23. However, when the heights of the optical fibers in the output side end face are alternately changed as illustrated in FIGS. 15 and 16, the pitch in the transverse direction between the waveguides can be set to less than 250 μm so that the waveguide length can be made small. Accordingly, on the basis of a waveguide length equivalent to that in the prior art, a stable ratio of the inside output to the outside output can be obtained.

Of course, it is allowable that the pitch in the transverse direction between the waveguides in the output side end face is set to 250 μm, which is the pitch of conventional optical fiber arrays, and all of the waveguides are formed on the same plane since no effect is produced on the ratio of the inside output to the outside output.

FIGS. 18(a)–(e) and FIGS. 19(a)–(e) are sectional views illustrating processes for producing the optical branch device 20. In the present example, its core layer, lower clad layer and upper clad layer are made of an organic and inorganic composite produced from an alkoxy silane. A core layer forming solution and a clad layer forming solution are prepared as follows.

[Preparation of a Core Layer Forming Solution]

The following are mixed: 5.6 mL of 3-methacryloxypropyltriethoxysilane, 5.8 mL of phenyltriethoxysilane, 1.65 mL of hydrochloric acid (2 N), and 21 mL of ethanol. Thereafter, the resultant mixture is allowed to stand still for 24 hours, thereby hydrolyzing and polycondensing 3-methacryloxypropyltriethoxysilane and phenyltriethoxysilane. To 4 mL of the resultant polycondensate is added 10 mg of 1-hydroxy-cyclohexyl-phenyl-ketone as a polymerization initiator, and then the resultant is heated at 100° C., thereby evaporating and removing ethanol to yield a viscous liquid A. Into 1 g of the viscous liquid A are incorporated 3 mL of trimethylethoxysilane and 0.8 mL of trifluoroacetic anhydride, and these components are mixed. The mixture is allowed to stand still for 24 hours, and then heated and dried at 100° C., thereby evaporating and removing an excess of trimethylethoxysilane and trifluoroacetic anhydride to yield a viscous liquid B. This viscous liquid B is used as a core layer forming solution. The refractive index of an organic and inorganic composite produced from this core layer forming solution was 1.519.

[Preparation of a Clad Layer Forming Solution]

In the preparation of the above-mentioned core layer forming solution, the blend ratio between 3-methacryloxypropyltriethoxysilane and phenyltriethoxysilane is changed in such a manner that the refractive index becomes 0.004 smaller, thereby preparing a clad layer forming solution.

Figure 18:
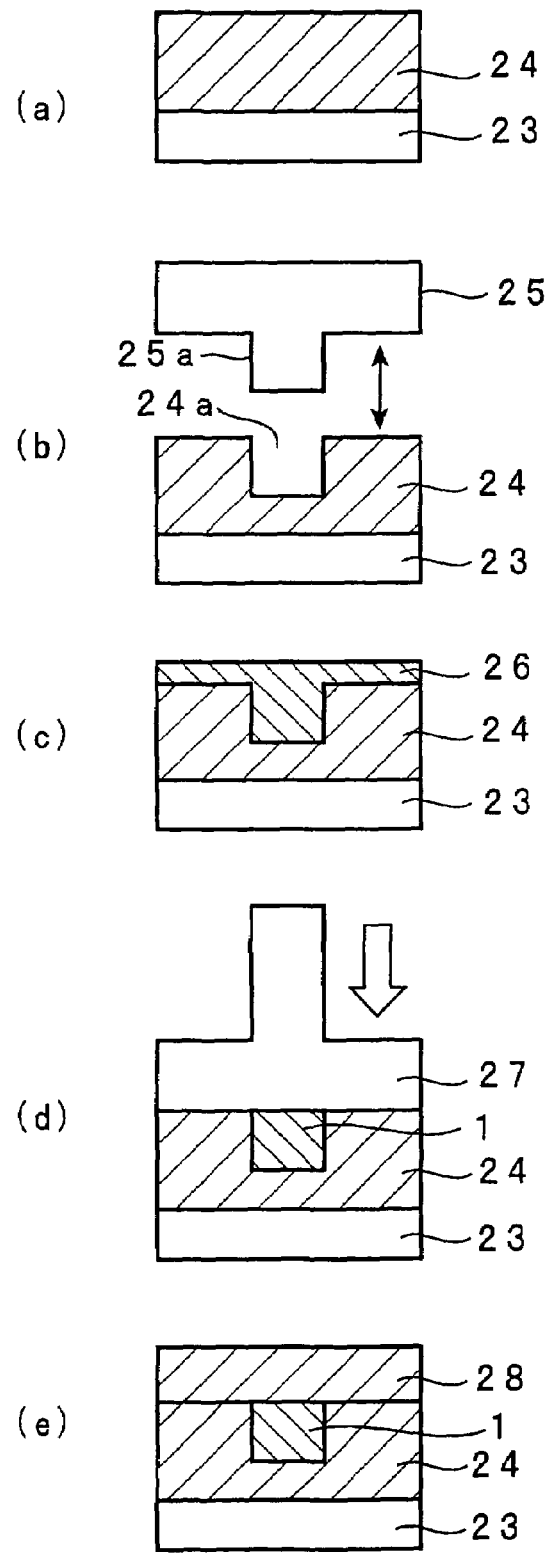
FIGS. 18(a)–(e) are sectional views illustrating a production process for an example according to the present invention.

FIG. 18 illustrate a production process for a region where the waveguide 1 is to be formed. As illustrated in FIG. 18(a), a clad layer forming solution 24 is dropped down onto a glass substrate 23. As illustrated in FIG. 18(b), next, a mold 25 having a convex portion 25a is pushed against a layer made of the clad layer forming solution 24. In this state, ultraviolet rays are radiated onto the layer from the side of the substrate 23, thereby curing the solution 24 to form a lower clad layer 24 having a groove 24a corresponding to the convex portion 25a.

As illustrated in FIG. 18(c), next, a core layer forming solution 26 is dropped down onto the lower clad layer 24. As illustrated in FIG. 18(d), next, a flat plate 27 is pushed onto the lower clad layer 24. While a load is applied onto the resultant, ultraviolet rays are radiated onto the core layer forming solution 26 from the side of the substrate 23, thereby curing the core layer forming solution 26 to form a core layer 1, as illustrated in FIG. 18(e).

Next, the flat plate 27 is removed, and then a clad layer forming solution is dropped down onto the lower clad layer 24 and the core layer 1. Ultraviolet rays are radiated onto the clad layer forming solution from the side of the substrate 23, thereby curing the clad layer forming solution to form an upper clad layer 28.

Figure 19:
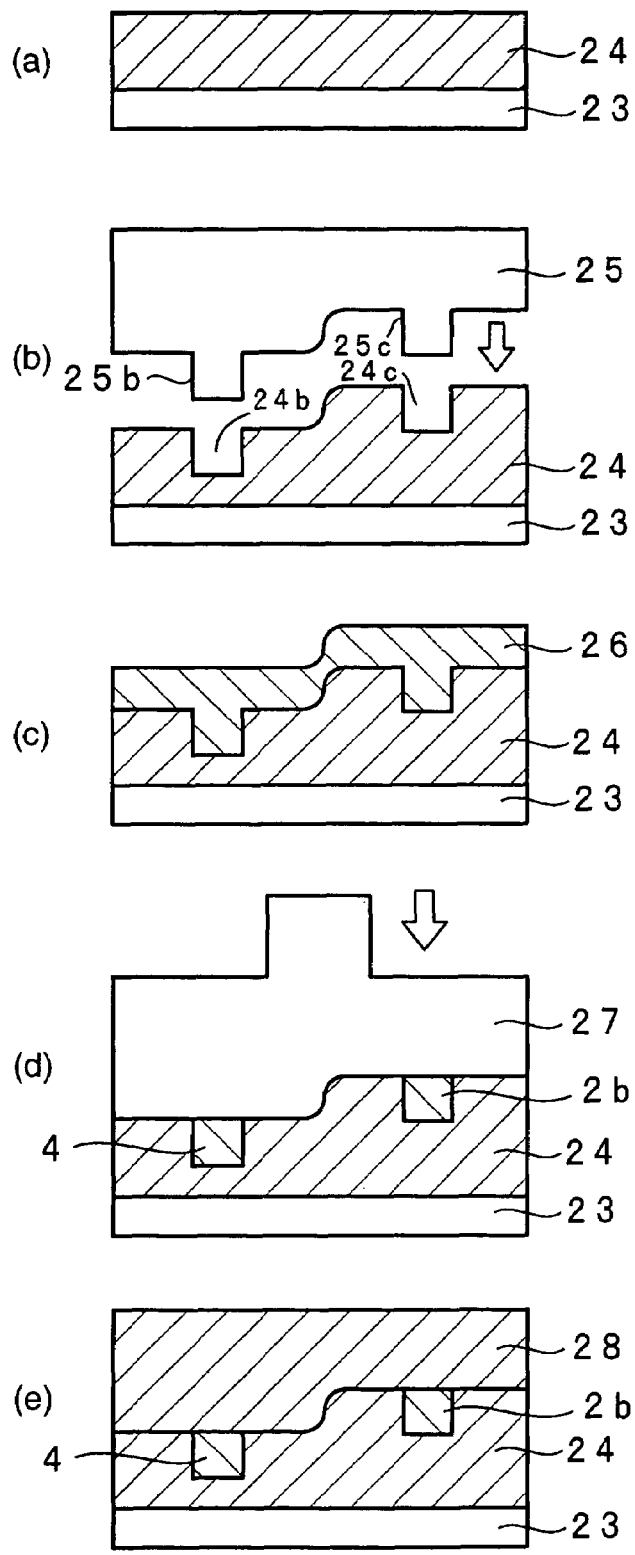
FIGS. 19(a)–(e) are sectional views illustrating a production process for the example according to the present invention.

FIG. 19 are sectional views illustrating a production process for a region where the waveguides 4 and 2b are to be formed. The waveguides 4 and 2b are formed at positions different in height.

As illustrated in FIG. 19(a), a clad layer forming solution 24 is dropped down onto a glass substrate 23. As illustrated in FIG. 19(b), next, a mold 25 having convex portions 25b and 25c at different positions is pushed against the clad layer forming solution 24. In this state, ultraviolet rays are radiated onto the clad layer forming solution 24 from the side of the substrate 23, thereby curing the clad layer forming solution 24 to form a lower clad layer 24 having grooves 24b and 24c.

As illustrated in FIG. 19(c), next, a core forming solution is dropped down onto the lower clad layer 24. As illustrated in FIG. 19(d), a flat plate 27 is then pushed onto the lower clad layer 24. In this state, ultraviolet rays are radiated onto the core forming solution from the side of the substrate 23, thereby curing the core forming solution to form the waveguides 4 and 2b. Next, the flat plate 27 is removed, and then a clad layer forming solution is dropped down onto the lower clad layer 24 and the core layers 4 and 2b. Thereafter, ultraviolet rays are radiated onto this solution from the side of the substrate 23, so as to form an upper clad layer 28, as illustrated in FIG. 19(e).

The waveguides 2a and 3 can also be formed in the same way as described above.

In the above-mentioned production process, the composition of the core layer forming solution and that of the clad layer forming solution, and others are adjusted, whereby the refractive index difference $\Delta n$ between the core and the clad can be adjusted. The interval pitch P between the waveguides can be adjusted by adjusting the position and the dimensional shape of the convex portions of the mold for forming the waveguides, or other factors.

Figure 20:
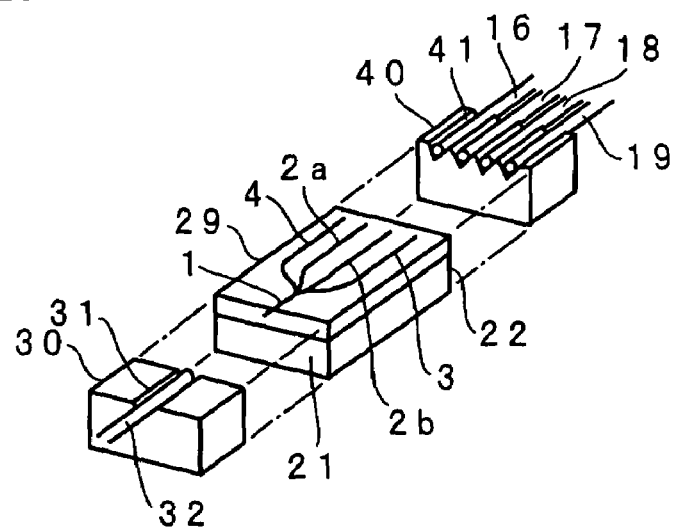
FIG. 20 is a perspective view illustrating an optical coupler module of an example according to the present invention.
Figure 21:
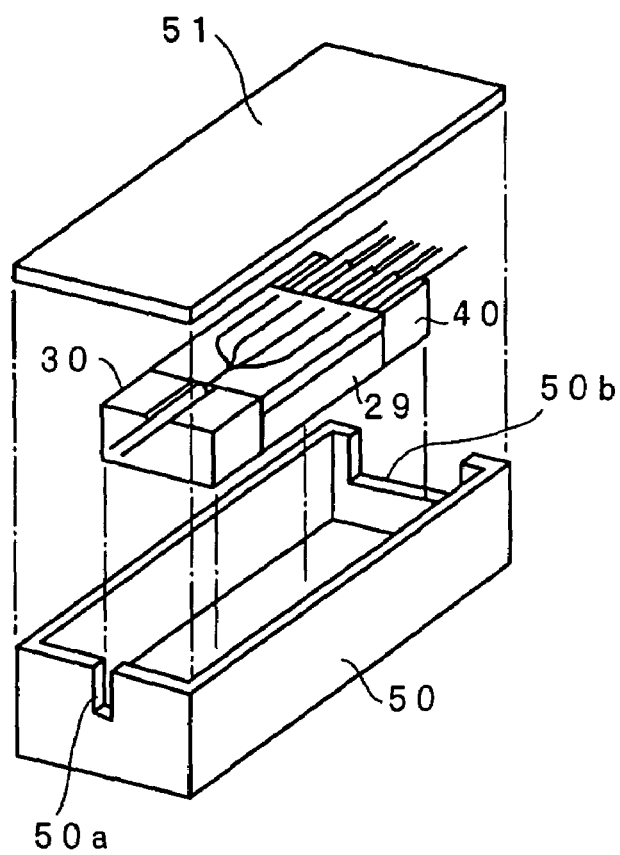
FIG. 21 is an exploded perspective view illustrating the optical coupler module of the example according to the present invention.

FIGS. 20 and 21 are a perspective view and an exploded perspective view illustrating an example of the optical coupler module of the present invention, respectively.

As illustrated in FIG. 20, in an optical branch device 29, a structure wherein all of waveguides 4, 2a, 2b and 3 are present on the same plane is adopted. The pitch between the waveguides on the side of its output side end face 22 is 250 µm. An optical fiber 32 is connected to a waveguide 1 of the optical branch device 29 on the side of its input side end face 21. The optical fiber 32 is fitted into a V-shaped groove 31 made in an input side substrate 30 with a UV curable resin. The substrate 30 is bonded to the optical branch device 29 with a UV curable resin.

Optical fibers 16, 17, 18 and 19 are connected to the waveguides 4, 2a, 2b and 3 in the output side end face 22 of the optical branch device 29, respectively. The optical fibers 16, 17, 18 and 19 are arranged at a pitch of 250 µm. The optical fibers 16, 17, 18 and 19 are fitted into four V-shaped grooves 41 made in an output side substrate 40 with a UV curable resin. The substrate 40 is bonded to the output side end face 22 of the optical branch device 29 with a UV curable resin.

The optical coupler module formed by combination as illustrated in FIG. 20 is put into a case 50 as shown in FIG. 21, and then a lid 51 is fitted onto the case 50.

Figure 22:
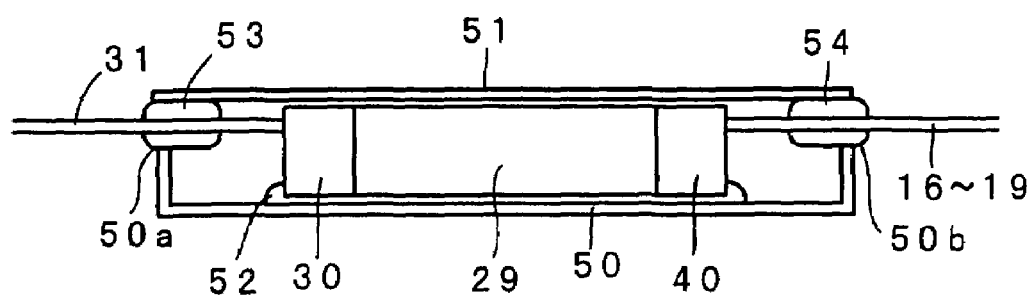
FIG. 22 is a sectional view illustrating the optical coupler module of the example according to the present invention.

FIG. 22 is a sectional view illustrating this state. The input side substrate 30, the optical branch device 29 and the output side substrate 40 are fitted to the bottom of the case 50 with an epoxy adhesive agent 52. The input side optical fiber 31 is passed inside a groove 50a in the case 50, and then taken outside. The output side optical fibers 16 to 19 are passed inside a groove 50b in the case 50, and then taken outside. The lid 51 is fitted to the case 50 with epoxy adhesive agents 53 and 54. Through the epoxy adhesive agents 53 and 54, the lid 51 is fitted to the case 50 and further the inside of the case 50 is encapsulated.

What is claimed is:

1. An optical branch device, comprising:
   a waveguide in a basic portion;
   a branch portion having a first branch waveguide extended linearly and continuously from the waveguide in the basic portion, and second and third branch waveguides which are branched from the basic waveguide in such a manner that the first branch waveguide is interposed therebetween and which are each extended in the directions farther from the first branch waveguide;
   a parallel portion composed of the first, second and third branch waveguides extended continuously from the branch portion, in which the second and third branch waveguides are positioned in parallel to the first branch waveguide; and
   a divergent portion composed of the first, second and third branch waveguides extended continuously from the parallel portion, in which the second and third branch waveguides are extended gradually farther from the first branch waveguide; and
   wherein the first, said second and third branch waveguides are each composed of a core having a relatively high refractive index and a clad arranged around the core and having a relatively low refractive index, and
   the interval pitch P (µm), in the transverse direction, between the first, second and third branch waveguides in the parallel portion and the refractive index difference ($\Delta n$) between the core and the clad are set in such a manner that C satisfies a relationship of C=0.5±0.2 wherein C is calculated by substituting P and $\Delta n$ for an equation of $C=\Delta n \times P^2$.

2. The optical branch device according to claim 1, wherein the second and third branch waveguides in the branch portion are extended in the form of straight lines.

3. The optical branch device according to claim 1, wherein the length of the parallel portion in the waveguide direction is less than the length of the branch portion.

4. The optical branch device according to claim 1, wherein the first branch waveguide is further branched into two branch waveguides, whereby four waveguides are branched from the basic waveguide.

5. An optical coupler module, comprising the optical branch device according to claim 1 and an optical fiber connected to an end of each of the waveguides in the optical branch device.

* * * * *